(12) United States Patent
Champel et al.

(10) Patent No.: US 8,078,034 B2
(45) Date of Patent: Dec. 13, 2011

(54) METHOD AND APPARATUS FOR NAVIGATING THROUGH SUBTITLES OF AN AUDIO VIDEO DATA STREAM

(75) Inventors: Mary-Luc Champel, Marpiré (FR); Nicolas Burdin, Rennes (FR); Pierre Houeix, Cesson-Sévigné (FR)

(73) Assignee: Thomson Licensing, Boulogne-Billancourt (FR)

( * ) Notice: Subject to any disclaimer, the term of this patent is extended or adjusted under 35 U.S.C. 154(b) by 1082 days.

(21) Appl. No.: 11/154,360

(22) Filed: Jun. 16, 2005

(65) Prior Publication Data
US 2006/0002684 A1 Jan. 5, 2006

(30) Foreign Application Priority Data
Jul. 5, 2004 (EP) .................................... 04300427

(51) Int. Cl.
*G11B 27/00* (2006.01)
*H04N 5/93* (2006.01)
*H04N 5/92* (2006.01)
*H04N 5/262* (2006.01)

(52) U.S. Cl. ........ 386/278; 386/280; 386/281; 386/282; 386/286; 386/326; 348/239

(58) Field of Classification Search .............. 386/95, 386/125–126, 52, 55, 278, 280, 281, 282, 386/286, 326; 348/239
See application file for complete search history.

(56) References Cited

U.S. PATENT DOCUMENTS

| | | | |
|---|---|---|---|
| 5,652,824 A * | 7/1997 | Hirayama et al. | 386/95 |
| 6,188,835 B1 * | 2/2001 | Grandbois | 386/126 |
| 6,754,435 B2 * | 6/2004 | Kim | 386/69 |
| 2004/0047589 A1 | 3/2004 | Kim | |
| 2004/0179820 A1 * | 9/2004 | Kashiwagi et al. | 386/95 |

FOREIGN PATENT DOCUMENTS

| | | |
|---|---|---|
| EP | 1 359 584 A2 | 11/2003 |
| EP | 1 214 712 B1 | 12/2008 |
| JP | 2002-354396 A | 12/2002 |
| JP | 2003-500785 A | 1/2003 |
| JP | 2004-080476 A | 3/2004 |

OTHER PUBLICATIONS

European Boradcasting Union Union, ETS 300 743, ETSI Standards, European Telecommunications Standards Institute, Sophia-Antipo, FR, vol. BC, Sep. 1997.
"Divace Solo Pro", Tandberg Educational, Mar. 6, 2004, pp. 1-2, XP002308600.
"Listening in a Foreign Language" Language Center Independent Learning, Mar. 31, 2004, pp. 1-2, XP002308601.
European Search Report.

* cited by examiner

*Primary Examiner* — Thai Tran
*Assistant Examiner* — Daquan Zhao
(74) *Attorney, Agent, or Firm* — Robert D. Shedd; Vincent E. Duffy; Joel M. Fogelson

(57) ABSTRACT

In a method and an apparatus for navigating through subtitles of an Audio Video data stream an address information of one or more played back data units is stored together with the subtitle information of said played back data units during play back of said data units. One or more of said stored subtitle information can be displayed. Following the selection of one of said displayed subtitle information the stored address information of the data unit corresponding to the selected subtitle information is retrieved and the corresponding data unit is accessed using said retrieved address information. Playing back the accessed data unit conveniently allows to watch and listen to a scene including subtitles again, e.g. by a few clicks on the remote control.

12 Claims, 3 Drawing Sheets

METHOD AND APPARATUS FOR NAVIGATING THROUGH SUBTITLES OF AN AUDIO VIDEO DATA STREAM

This application claims the benefit, under 35 U.S.C. §119 of European Patent Application 04300427.4, filed Jul. 5, 2004.

FIELD OF THE INVENTION

The invention relates to a method and to an apparatus for navigating through subtitles of an Audio Video data stream, which allows an accurate replay of video scenes including subtitles e.g. for language learning purposes.

BACKGROUND OF THE INVENTION

In the very beginning, movies were only broadcasted by TV stations with audio signals in the original language or were provided with an entirely translated version of the audio signal. Later on subtitles were added as translation for foreign language movies but also parallel to the audio signal in the same language for the benefit of the hard of hearing viewing community. The possibility to listen to a foreign language while being able to read its translation into the mother tongue has made subtitling also a tool for language learning.

Subtitles can be provided as so-called open subtitles, which are put into the TV picture already at the TV station before the TV signal is transmitted. This enables the viewers to see subtitles without the need of a special decoder in the TV set. However, as a result only one language can be transmitted at a time and the subtitles cannot be switched off. Nowadays more popular is the use of so-called closed captioning, where the subtitles are transmitted in a hidden part of the TV picture. For analog TV signals the closed captioning subtitles are inserted in the Vertical Blanking Interval (VBI) between the frames of the TV signal and are transmitted e.g. in Europe as Teletext data, in the US as line 21 data. At the receiving end the subtitling data are extracted from the VBI by a data slicer, decoded using a Teletext or Closed Captioning Decoder and displayed together with the video content if called up by the viewer. This way it is possible for each viewer to decide whether he wants to see subtitles or not.

Similarly, digital TV signals may comprise subtitles. Especially, digital satellite TV allows satellite broadcasters to transmit the program with more than one language for audio and subtitles, giving the viewer the possibility to choose the audio language and the subtitles in a language he wants to have.

Movies and other broadcasts including subtitles may be recorded by a viewer using a video cassette recorder or other recording devices. This allows replaying the whole movie or parts of it, which is especially helpful for language learning purposes. Furthermore, not only broadcasted movies may come with subtitle information but also pre-recorded movies. Especially, movies pre-recorded on DVD (Digital Versatile Disc) usually offer at least two spoken languages and many subtitle languages. This allows the DVDs to be widely distributed without producing different language specific versions for each individual country and makes them also a very efficient media for learning a foreign language.

SUMMARY OF THE INVENTION

The invention is based on the recognition of the following fact. Subtitles are often used by people who want to learn or improve their knowledge of a foreign language. When learning a foreign language, there are words or even sentences that are difficult to understand and a repeat is usually needed. Recorded media like DVDs allow the viewer to rewind the movie and play back from where he rewound in order to listen to a specific sentence once again. However, due to limited accuracy of this process the movie is usually rewound too much and a slight accelerated forward move may be needed with the risk of moving too much forward, thus requiring to rewind again. This is not very comfortable for the viewer, since, different to a normal movie watch, for language learning a replay may be necessary regularly. Similarly, this kind of navigation through the last subtitles is also very inconvenient for deaf viewer using subtitles as a replacement of the not perceptible audio signal.

In principle, the inventive method for navigating through subtitles of an AV data stream comprises:
- playing back data units of said AV data stream, said data units including video, audio and subtitle data packets;
- storing access information of one or more played back data units together with subtitle information data of said played back data units, wherein the subtitle information data are the displayable part of the subtitle data packets of said played back data units;
- generating a display of one or more of said stored subtitle information data;
- detecting a selection of one of said stored subtitle information data for which a display has been generated;
- retrieving the stored access information of the data unit corresponding to the selected subtitle information data;
- accessing said corresponding data unit using said retrieved access information; and
- playing back said accessed data unit.

This allows an accurate navigating through subtitles of an Audio Video data stream, yielding a very comfortable way of watching and listening to the same scene including the same subtitles, e.g. by a few clicks on the remote control.

Advantageous additional embodiments of the invention are disclosed in the respective dependent claims and the following description.

BRIEF DESCRIPTION OF THE DRAWINGS

Exemplary embodiments of the invention are described with reference to the accompanying drawings, which show in FIGS. 1A to 1C how a display of a list of last subtitles can be used for navigation according to the invention.

DETAILED DESCRIPTION OF PREFERRED EMBODIMENTS

FIG. 1 shows how a display of a list of last subtitles can be used for navigation according to the invention.

Figure 1A:
Figure 1B:
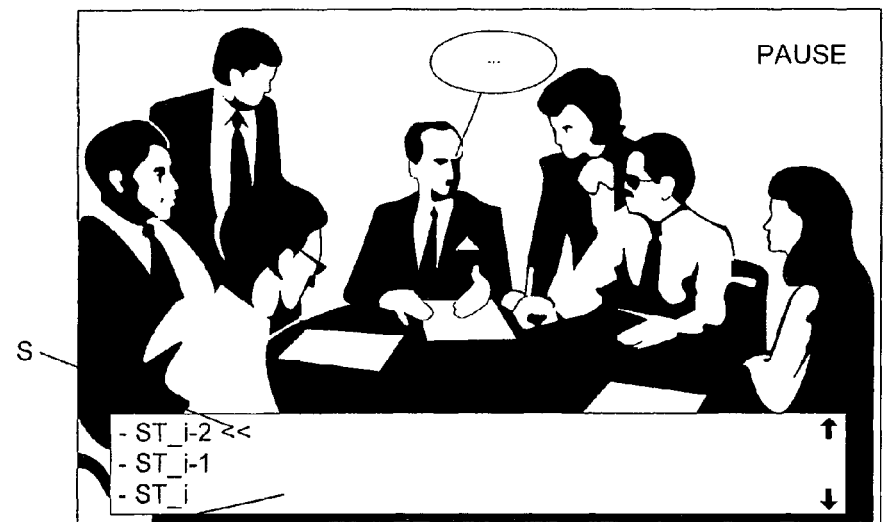
Figure 1C:

In FIG. 1A exemplarily depicts a scene of a movie, which is played back from a storage medium, indicated by "PLAY" in the upper right corner of the display. Three men are sitting at a table and the right person is talking. Shortly after several people are joining the group and an other person is talking, as shown in FIG. 1B. If the viewer now realizes that he has not understood correctly what was said in the first scene of FIG. 1A, he can call up a list D of last subtitles overlaid on the video signal. Simultaneously, the playback is paused as indicated by "PAUSE". Thanks to the subtitle list D, the user can navigate between the last subtitles ST_i, ST_i-1 and ST_i-2, e.g. using the up- and down-cursors of a remote control. The number of subtitles presented in the list is implementation dependent as it basically depends on how much memory is dedicated to store the subtitling information. Once the user has selected a subtitle in the list, which is subtitle i-2 in FIG. 1B and may be emphasized by an indicator S like "<<", highlighting or other measures, the movie is replayed starting from the corresponding scene as shown in FIG. 1C. This may be indicated by "REPLAY" on the screen.

This list may appear on the screen after a corresponding command by the user, e.g. when a special button on the remote control is pressed. Similarly, a subtitle list display command can be uttered by the user as a voice command. However, it is also possible to permanently display a list of several last subtitles, wherein the subtitles are scrolled through a dedicated subtitle window.

The subtitle list display may be replaced by a "jump to previous subtitle" feature or such feature may be added, allowing the user to select one of these two display variants. The "jump to previous subtitle" feature is e.g. useful in case of subtitles having varying format and makes subtitle selection even easier and quicker in case the user only wants to replay the last subtitle. Also this implementation allows to navigate to subtitles before the last subtitles by moving backward from one subtitle to another. Like the list display this feature can be performed after pressing a specific key on the remote control, which can be the same than for the subtitle list display but also an additional one.

Such a subtitle navigating mechanism can be implemented e.g. in DVD players/recorders or Hard disc recorders or PVRs (Personal Video Recorders). The implementation in a DVD player is explained in the following as one exemplary embodiment of the invention.

In order to be decoded, a digital Audio Video stream is usually cut into small packets that can contain either audio, video or auxiliary data like subtitles and they are all synchronized thanks to a timeline obtained with timestamps regularly conveyed inside some packet headers. In the case of DVD, all these packets are grouped into global packets called Video Object Unit (VOBU). A VOBU is the smallest accessible data unit for a DVD player, containing the data for a presentation period between 0.4 seconds and at most 1.2 seconds. Therefore, e.g. for fast forward and fast rewind the DVD player usually jumps from one VOBU to the next VOBU.

Figure 2:
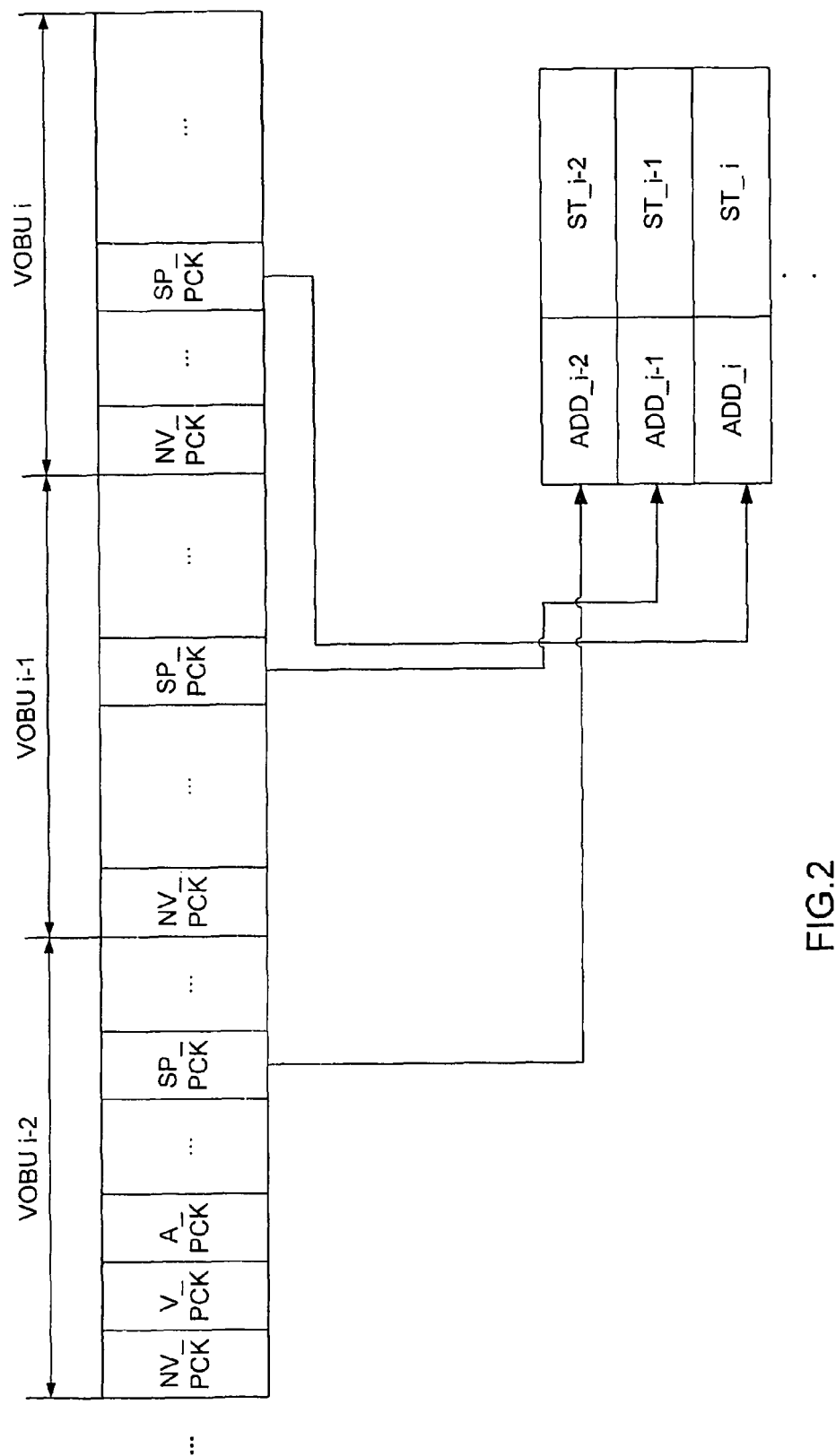
FIG. 2 for a DVD implementation couples of VOBU addresses and subtitles with the corresponding VOBUs.

FIG. 2 depicts for a DVD implementation VOBUs together with corresponding couples of VOBU addresses and subtitles. Three VOBUs of the video stream VOBU i-2, VOBU i-1, VOBU i are exemplarily shown. The first element of each VOBU is always a navigation pack NV_PCK. It contains so-called presentation control information (PCI), and data search information (DSI) that is needed for navigating from one VOBU to another (next, previous, x seconds before or later, etc. . . . ) or for navigating inside one VOBU (between Intra images for instance). Then the VOBU contains various video packets V_PCK, audio packets A_PCK and sub-picture packets SP_PCK. The sub-picture packets carry the data of up to 32 sub-picture streams, which are usually used for various subtitles in different languages. Further details can be found in the DVD standard, DVD Specifications for Read-Only Disc, part 3, Video Specifications, version 1.0, Aug. 3, 1996, Chapter 5.

For navigating between the last subtitles the DVD player stores the following information while he is playing-back a disc:
  address of the VOBU, in FIG. 2 exemplarily the addresses ADD_i-2, ADD_i-1 and ADD_i; and
  the SP-PCK payload, in FIG. 2 labelled ST_i-2, ST_i-1 and ST_i.

During playback the current VOBU address, i.e. the address of the DVD sector carrying the current VOBU, is read by the DVD player and the SP_PCK payload is fed into a sub-picture buffer for further processing. Therefore, both the VOBU address and the SP_PCK payload can be copied into a dedicated memory without requiring additional processing.

Using the information stored in the dedicated memory, the user is able to navigate between the last subtitles. When the user presses a specific button, the DVD player pauses the movie, seeks in its memory the last played subtitle, retrieves the coded subtitle and sends it to the subtitle decoder, retrieves the decoded subtitle and renders it on top of the paused video. If the user presses the subtitle navigation button again, the DVD player does the same process with the previous subtitles. When the user has finally chosen the right subtitle, he can press an OK button or a play button. At that time, the DVD player checks in its memory what the VOBU address corresponding to the selected subtitle is and starts decoding and playing-back this particular VOBU. Therefore, the video section to be repeated can be searched just by reading out the dedicated memory without decoding any intermediate VOBUs and correspondingly the pickup of the DVD player can directly jump to the searched video section without any jumps to the intermediate VOBUs. Thus, there is no waiting time for going through the stored subtitles and mechanical stress of the pickup for this additional feature is reduced to the minimum.

Figure 3:
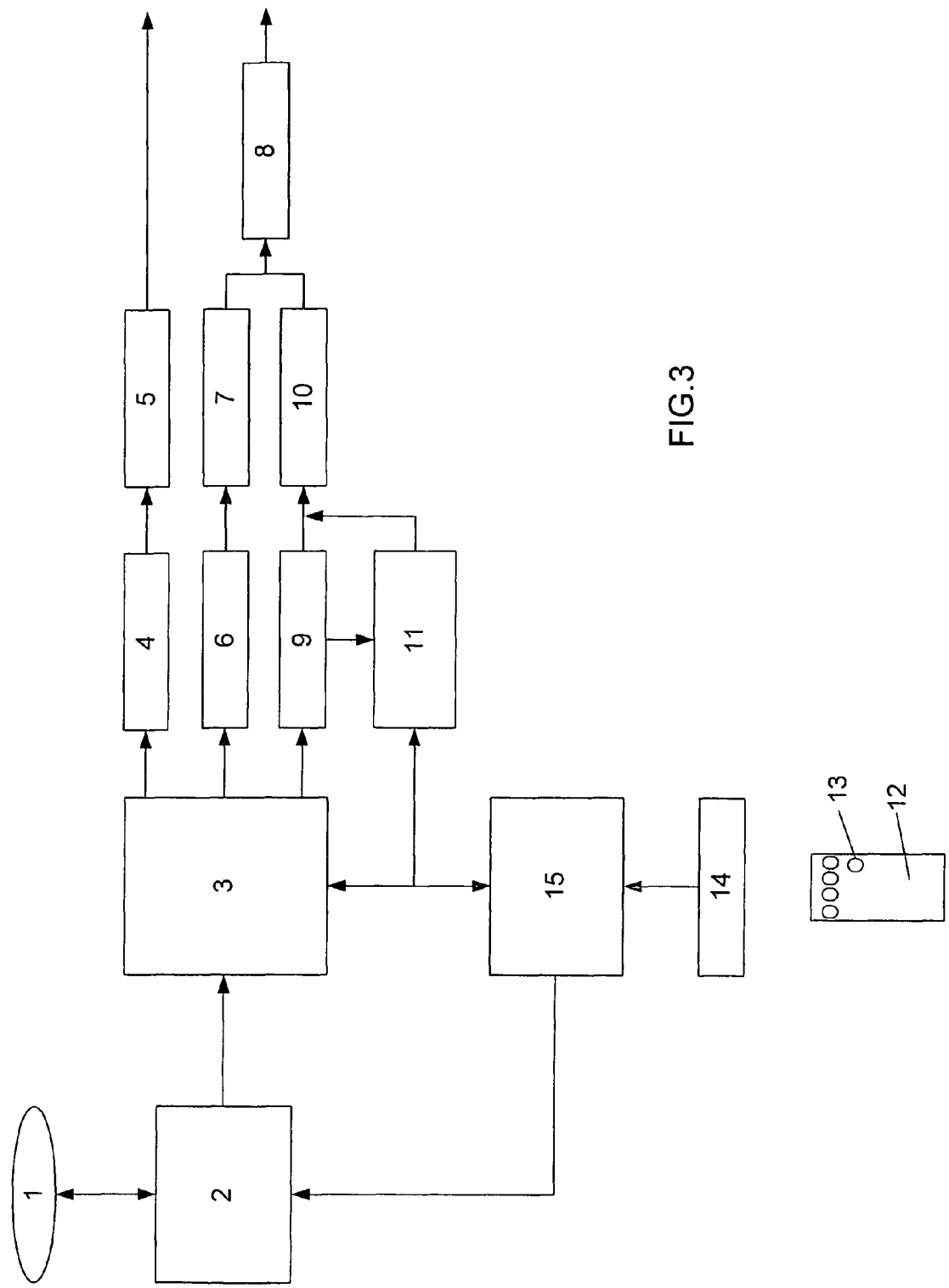
FIG. 3 a block diagram of an apparatus allowing subtitle navigation according to the invention.

FIG. 3 shows a block diagram of a DVD playback device allowing subtitle navigation according to the invention. Only parts of the apparatus relevant for the invention are depicted and some blocks aggregate several functional units for the sake of clarity. A DVD 1 carrying a movie to be watched is read out using an optical pickup, which together with the disc motor is part of block 2. The RF signal is fed to block 3, which includes especially pre-amplification of the RF signal, demodulation, error correction, track buffering and finally demultiplexing into the packetized elementary streams. There are five kinds of packetized elementary streams: video, audio, sub-picture (used especially for carrying subtitles), presentation control information (PCI), and data search information (DSI).

The audio data are temporary stored in an audio buffer 4 and fed to an audio decoder 5, which may be a Dolby Digital or MPEG audio decoder. Digital audio signals at the audio decoder output may be output either directly or as an analog audio signal after digital to analog conversion. Correspondingly video data are temporary stored in an video buffer 6 and fed to an video decoder 7, especially an MPEG video decoder. The decoded video signals may first by fed to a not shown picture processor and are then joint with sub-picture or menu displays by a mixer 8.

The sub-pictures carrying subtitling result from sub-picture data which are decoded by a sub-picture decoder 10 after being temporarily stored in an sub-picture buffer 9. According to the invention the sub-picture data, i.e. the SP_PCK payload, is copied together with the current VOBU address into a dedicated memory 11. Depending on the size of the memory dedicated to this particular storage, the DVD player may be able to store couples (VOBU address, coded subtitles) corresponding to several subtitles already played. According to the DVD standard, coded sub-pictures may have a maximum size of 52 kB and the VOBU address takes 4 Bytes but usually coded subtitles have a size between 2 kB and 4 kB. Therefore, even with a dedicated memory having only a capacity of 64 kB, the DVD player is able to store more than the 16 last subtitles played.

A remote control 12 of the DVD playback device comprises a subtitle navigation button 13. When the subtitle navigation button 13 is pressed, a corresponding signal is transmitted, received by the DVD playback device and processed by a remote control signal processing unit 14. A control unit 15 comprises besides the system control of the DVD playback device also the subtitle navigation control. When the control unit 15 detects a subtitle navigation command from the user, it pauses the movie, seeks in the dedicated memory 11 the last played subtitle(s), retrieves the coded subtitle(s) and sends it to the subtitle decoder 10. The decoded subtitle(s) are retrieved and are rendered on top of the paused video. When a subtitle is selected, the VOBU address corresponding to the selected subtitle is also retrieved from the dedicated memory 11, the control unit 15 causes a jump back to that VOBU, which is read in again from DVD 1, processed, decoded and played-back.

In the above example the subtitles are encoded as sub-pictures, and more specifically as run-length-encoded bit-maps. This has several advantages like variable colors for foreground and background, different transparency levels, arbitrary fonts allowing also various effects like color changes, fading or moving highlights. Compared to that a character based coding of subtitles has only limited possibilities but also requires much less data rate. Consequently, in a dedicated memory having the above mentioned capacity of 64 kB even more subtitles using a character based coding can be stored. Such character based subtitles can be stored on a storage medium like the DVD instead or in addition to the bitmap coded subtitles.

Similarly, for digital television transmission using the European DVB standard subtitles can be transmitted only as bitmap, only character based or in both formats. More specifically, the DVB subtitling standard ETSI 300 743 details two methods of transmitting subtitles—bit-map subtitling and code-based subtitling. In addition, subtitles can also be transmitted within teletext accompanying the digital TV signal. Depending on the implementation a recording device for digital TV signals may record only bitmap encoded subtitles, only character based subtitles, both formats, or even transcode subtitles received in one of the formats into the other format. Typically, a DVB multiplexed signal carries several separate video channels, associated audio channels, service tables and private data channels, which may carry DVB subtitle data. Each of these data streams is identified using a unique packet ID 'PID'. The DVB decoders are aware from the DVB service tables which PID streams carry subtitles for each video service in the multiplex. Furthermore, the subtitles have an associated Presentation Time Stamp (PTS), which indicates to the DVB decoder at which point in time it should appear on the screen.

According to the invention the subtitle information may be stored together with the PTS of the corresponding video scene or with similar time information, which may be derived from the PTS. However, due to the recording of the DVB signal also logical or physical addresses of the data units carrying the respective subtitles on the storage medium may be used similar to the above-described embodiment using pre-recorded DVDs.

An advantage of the invention is to allow the user to precisely navigate in the video using subtitles appearances. This is very convenient for people who use subtitling as a foreign language-learning tool, since they can go back precisely to the word or sentence they have not understood. Similarly, this kind of navigation through the last subtitles is also comfortable for a deaf viewer who has missed one of the last subtitles.

However, the invention is not restricted to these applications but can also be used as a general tool for navigating through a complete recorded movie. For that purpose all subtitles of the movie and the corresponding addresses may be stored, e.g. in a separate subtitle navigating file recorded on the HDD or DVD. The subtitle navigating file may be generated automatically during first playback of the movie, or later on at any arbitrary time after a corresponding command by the user. In case of recording a movie the subtitle navigating file may be generated already at recording or later during playback.

What is claimed is:

1. Method for navigating through subtitles of an audio/video data stream, comprising:
    playing back data units of said audio/video data stream, said data units including video, audio and subtitle data packets;
    storing access information of one or more previously played back data units together with subtitle information data of said previously played back data units, wherein the subtitle information data are the displayable part of the subtitle data packets of said played back data units;
    generating a list displaying, at the same time, of two or more of said stored subtitle information data where each stored subtitled information data corresponds to a respective played back data unit;
    detecting in response to a user selection on said list of one of said stored subtitle information data for which a display has been generated;
    retrieving the stored access information of the data unit corresponding to the selected subtitle information data;
    accessing said corresponding data unit using said retrieved access information; and
    playing back said accessed data unit.

2. Method according to claim 1, wherein only one preceding subtitle is displayed at a time.

3. Method according to claim 2, wherein following a first user command a first preceding subtitle is displayed, following a second user command a second preceding subtitle is displayed and the same process can be repeated as long as subtitle information data are stored together with the access information of the corresponding data units.

4. Method according to claim 1, wherein a list of several preceding subtitles is displayed at a time.

5. Method according to claim 1, wherein the access information is a logical or physical address of the data unit carrying the respective subtitle on a storage medium, from which the data units of said audio/video data stream are played back.

6. Method according to claim 5, wherein said data units are played back from a DVD, a data unit being a Video Object Unit and said address information corresponding to an address of said Video Object Unit.

7. Method according to claim 1, wherein said selection of said displayed subtitle information is done using a specific button of a remote control for an audio/video playback device.

8. Apparatus for navigating through subtitles of an audio/video data stream, comprising:
    means for playing back data units of said audio/video data stream, said data units including video, audio and subtitle data packets;
    means for storing access information of one or more played back data units together with subtitle information data of said played back data units, wherein the subtitle information data are the displayable part of the subtitle data packets of said played back data units;

means for generating a displayed list of two or more of said stored subtitle information data, at the same time, where each stored subtitled information data corresponds to a respective played back data unit;

means for detecting a selection from said list of one of said stored subtitle information data for which a display has been generated;

means for retrieving the stored access information of the data unit corresponding to the selected subtitle information data;

means for accessing said corresponding data unit using said retrieved access information; and means for playing back said accessed data unit.

9. Apparatus according to claim 8, further comprising means for selecting of one of said displayed subtitle information data by a user.

10. Apparatus according to claim 8, said apparatus being an audio/video playback device.

11. Apparatus according to claim 10, wherein said means for selecting of one of said displayed subtitle information data is a specific button of a remote control of said audio/video playback device.

12. Apparatus according to claim 10, wherein said access information is stored in a dedicated memory within said audio/video playback device.

* * * * *